United States Patent
Di Cera et al.

(10) Patent No.: US 10,972,752 B2
(45) Date of Patent: Apr. 6, 2021

(54) STEREOSCOPIC INTERLEAVED COMPRESSION

(71) Applicant: Advanced Micro Devices, Inc., Santa Clara, CA (US)

(72) Inventors: Darren Rae Di Cera, Reservoir (AU); Adam William Lynch, Melbourne (AU)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 16/210,804

(22) Filed: Dec. 5, 2018

(65) Prior Publication Data

US 2020/0186832 A1   Jun. 11, 2020

(51) Int. Cl.
| | |
|---|---|
| *H04N 19/597* | (2014.01) |
| *H04N 19/88* | (2014.01) |
| *H04N 19/137* | (2014.01) |
| *H04N 19/146* | (2014.01) |
| *H04N 19/164* | (2014.01) |
| *H04N 19/33* | (2014.01) |

(52) U.S. Cl.
CPC ......... *H04N 19/597* (2014.11); *H04N 19/137* (2014.11); *H04N 19/146* (2014.11); *H04N 19/164* (2014.11); *H04N 19/33* (2014.11); *H04N 19/88* (2014.11)

(58) Field of Classification Search
CPC .... H04N 19/11; H04N 19/115; H04N 19/127; H04N 19/13; H04N 19/146; H04N 19/156
USPC .................................................. 375/240.02
See application file for complete search history.

(56) References Cited

U.S. PATENT DOCUMENTS

| | | | |
|---|---|---|---|
| 2005/0047504 A1 | 3/2005 | Sung et al. | |
| 2012/0144336 A1* | 6/2012 | Pinter | H04N 7/15 715/772 |
| 2014/0269919 A1 | 9/2014 | Rodriguez | |
| 2014/0376624 A1 | 12/2014 | Li et al. | |

(Continued)

OTHER PUBLICATIONS

"Co-occurrence matrix", Wikipedia.org, Sep. 7, 2016, 2 pages, https://en.wikipedia.org/wiki/Co-ocurrence_matrix. [Retrieved Jul. 31, 2018].

(Continued)

*Primary Examiner* — Dominic D Saltarelli
(74) *Attorney, Agent, or Firm* — Kowert Hood Munyon Rankin and Goetzel PC; Rory D. Rankin (57) ABSTRACT

Systems, apparatuses, and methods for implementing stereoscopic interleaved compression techniques are disclosed. A system includes a transmitter sending a video stream over a wireless link to a receiver. For each pair of frames, the transmitter encodes a left-half of a first frame of the pair with an amount of compression less than a first threshold and encodes a right-half of the first frame with an amount of compression greater than a second threshold. For a second frame of the pair, the transmitter encodes a right-half of the second frame with an amount of compression less than the first threshold and encodes a left-half of the second frame with an amount of compression greater than the second threshold. The transmitter conveys encoded half-frames and indications of an amount of compression used for each half-frame to a receiver. The receiver receives, decodes, and drives the encoded half-frames to a display.

20 Claims, 6 Drawing Sheets

(56) References Cited

U.S. PATENT DOCUMENTS

| | | | |
|---|---|---|---|
| 2015/0055706 A1 | 2/2015 | Xu et al. | |
| 2015/0256850 A1 | 9/2015 | Kottke et al. | |
| 2016/0344999 A1* | 11/2016 | Lajeunesse | H04N 5/23238 |
| 2018/0109804 A1 | 4/2018 | Saeedi | |
| 2019/0045210 A1 | 2/2019 | Guermazi et al. | |
| 2020/0244942 A1* | 7/2020 | Maze | H04N 21/4347 |
| 2020/0288171 A1* | 9/2020 | Hannuksela | H04N 13/128 |
| 2020/0336730 A1* | 10/2020 | Kim | H04N 13/366 |

OTHER PUBLICATIONS

International Search Report and Written Opinion in International Application No. PCT/IB2019/057945, dated Dec. 9, 2019, 8 pages.

* cited by examiner

STEREOSCOPIC INTERLEAVED COMPRESSION

BACKGROUND

Description of the Related Art

A wireless communication link can be used to send a video stream from a computer (or other device) to a virtual reality (VR) headset (or head mounted display (HMD). Transmitting the VR video stream wirelessly eliminates the need for a cable connection between the computer and the user wearing the HMD, thus allowing for unrestricted movement by the user. A traditional cable connection between a computer and HMD typically includes one or more data cables and one or more power cables. Allowing the user to move around without a cable tether and without having to be cognizant of avoiding the cable creates a more immersive VR system. Sending the VR video stream wirelessly also allows the VR system to be utilized in a wider range of applications than previously possible.

Wireless VR video streaming applications typically have high resolution and high frame-rates, which equates to high data-rates. However, the link quality of the wireless link over which the VR video is streamed has capacity characteristics that can vary from system to system and fluctuate due to changes in the environment (e.g., obstructions, other transmitters, radio frequency (RF) noise). The VR video content is often rendered using a stereoscopic technique. As used herein, the term "stereoscopic" is defined as creating or enhancing the illusion of depth in a frame by displaying the same scene at slightly different angles such that when the two scenes are viewed together by the left and right eyes, the scene gains an impression of depth and solidity. It can be challenging to compress VR video for transmission over a low-bandwidth wireless link while minimizing any perceived reduction in video quality by the end user.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF IMPLEMENTATIONS

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, methods, and computer-readable mediums for implementing stereoscopic interleaved compression techniques (generally referred to herein as an "interleaved transmission scheme") are disclosed herein. In one implementation, a system includes a transmitter sending a video stream over a wireless link to a receiver. The transmitter compresses frames of the video stream prior to sending the frames to the receiver. For each pair of frames, the transmitter encodes a left-half of a first frame of the pair with an amount of compression less than a first threshold and encodes a right-half of the first frame with an amount of compression greater than a second threshold. In various embodiments, the pair of frames are consecutive frames of the video. For a second frame of the pair, the transmitter encode a right-half of the second frame with an amount of compression less than the first threshold and encodes a left-half of the second frame with an amount of compression greater than the second threshold. The transmitter conveys encoded half-frames and indications of an amount of compression for each half-frame to a receiver. The receiver receives, decodes, and drives the encoded half-frames to a display.

Figure 1:
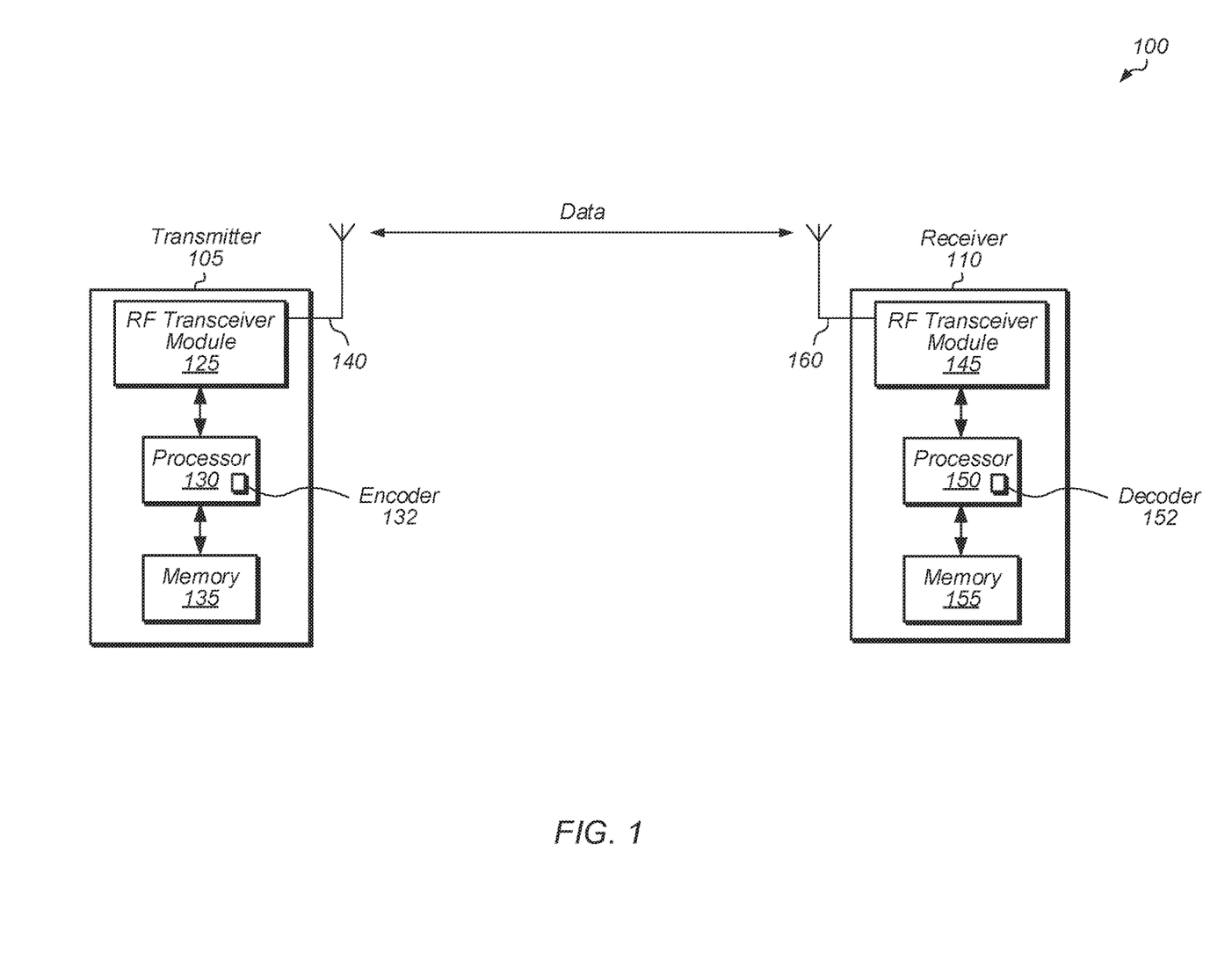
FIG. 1 is a block diagram of one implementation of a system.

Referring now to FIG. 1, a block diagram of one implementation of a system 100 is shown. System 100 includes at least a first communications device (e.g., transmitter 105) and a second communications device (e.g., receiver 110) operable to communicate with each other wirelessly. It is noted that transmitter 105 and receiver 110 can also be referred to as transceivers. In one implementation, transmitter 105 and receiver 110 communicate wirelessly over the unlicensed 60 Gigahertz (GHz) frequency band. For example, in this implementation, transmitter 105 and receiver 110 communicate in accordance with the Institute of Electrical and Electronics Engineers (IEEE) 802.11ad standard (i.e., WiGig). In other implementations, transmitter 105 and receiver 110 communicate wirelessly over other frequency bands and/or by complying with other wireless communication protocols, whether according to a standard or otherwise. For example, other wireless communication protocols that can be used include, but are not limited to, Bluetooth®, protocols utilized with various wireless local area networks (WLANs), WLANs based on the Institute of Electrical and Electronics Engineers (IEEE) 802.11 standards (i.e., WiFi), mobile telecommunications standards (e.g., CDMA, LTE, GSM, WiMAX), etc.

Wireless communication devices that operate within extremely high frequency (EHF) bands, such as the 60 GHz frequency band, are able to transmit and receive signals using relatively small antennas. However, such signals are subject to high atmospheric attenuation when compared to transmissions over lower frequency bands. In order to reduce the impact of such attenuation and boost communication range, EHF devices typically incorporate beamforming technology. For example, the IEEE 802.11ad specification details a beamforming training procedure, also referred to as sector-level sweep (SLS), during which a wireless station tests and negotiates the best transmit and/or receive antenna combinations with a remote station. In various implementations, transmitter 105 and receiver 110 perform periodic beamforming training procedures to determine the optimal transmit and receive antenna combinations for wireless data transmission.

In one implementation, transmitter 105 and receiver 110 have directional transmission and reception capabilities, and the exchange of communications over the link utilizes directional transmission and reception. Each directional transmission is a transmission that is beamformed so as to be directed towards a selected transmit sector of antenna 140. Similarly, directional reception is performed using antenna settings optimized for receiving incoming transmissions from a selected receive sector of antenna 160. The link quality can vary depending on the transmit sectors selected for transmissions and the receive sectors selected for receptions. The transmit sectors and receive sectors which are selected are determined by system 100 performing a beamforming training procedure.

Transmitter 105 and receiver 110 are representative of any type of communication devices and/or computing devices. For example, in various implementations, transmitter 105 and/or receiver 110 can be a mobile phone, tablet, computer, server, head-mounted display (HMD), television, another type of display, router, or other types of computing or communication devices. In one implementation, system 100 executes a virtual reality (VR) application for wirelessly transmitting frames of a rendered virtual environment from transmitter 105 to receiver 110. In other implementations, other types of applications can be implemented by system 100 that take advantage of the methods and mechanisms described herein.

In one implementation, transmitter 105 includes at least radio frequency (RF) transceiver module 125 including an interface configured to transmit data, processor 130, memory 135, and antenna 140. RF transceiver module 125 transmits and receives RF signals. In one implementation, RF transceiver module 125 is a mm-wave transceiver module operable to wirelessly transmit and receive signals over one or more channels in the 60 GHz band. RF transceiver module 125 converts baseband signals into RF signals for wireless transmission, and RF transceiver module 125 converts RF signals into baseband signals for the extraction of data by transmitter 105. It is noted that RF transceiver module 125 is shown as a single unit for illustrative purposes. It should be understood that RF transceiver module 125 can be implemented with any number of different units (e.g., chips) depending on the implementation. Similarly, processor 130 and memory 135 are representative of any number and type of processors and memory devices, respectively, that are implemented as part of transmitter 105. In one implementation, processor 130 includes encoder 132 to encode (i.e., compress) a video stream prior to transmitting the video stream to receiver 110. In other implementations, encoder 132 is implemented separately from processor 130. In various implementations, encoder 132 is implemented using any suitable combination of hardware and/or software.

Transmitter 105 also includes antenna 140 for transmitting and receiving RF signals. Antenna 140 represents one or more antennas, such as a phased array, a single element antenna, a set of switched beam antennas, etc., that can be configured to change the directionality of the transmission and reception of radio signals. As an example, antenna 140 includes one or more antenna arrays, where the amplitude or phase for each antenna within an antenna array can be configured independently of other antennas within the array. Although antenna 140 is shown as being external to transmitter 105, it should be understood that antenna 140 can be included internally within transmitter 105 in various implementations. Additionally, it should be understood that transmitter 105 can also include any number of other components which are not shown to avoid obscuring the figure. Similar to transmitter 105, the components implemented within receiver 110 include at least RF transceiver module 145, processor 150, decoder 152, memory 155, and antenna 160, which are analogous to the components described above for transmitter 105. It should be understood that receiver 110 can also include or be coupled to other components (e.g., a display).

Figure 2:
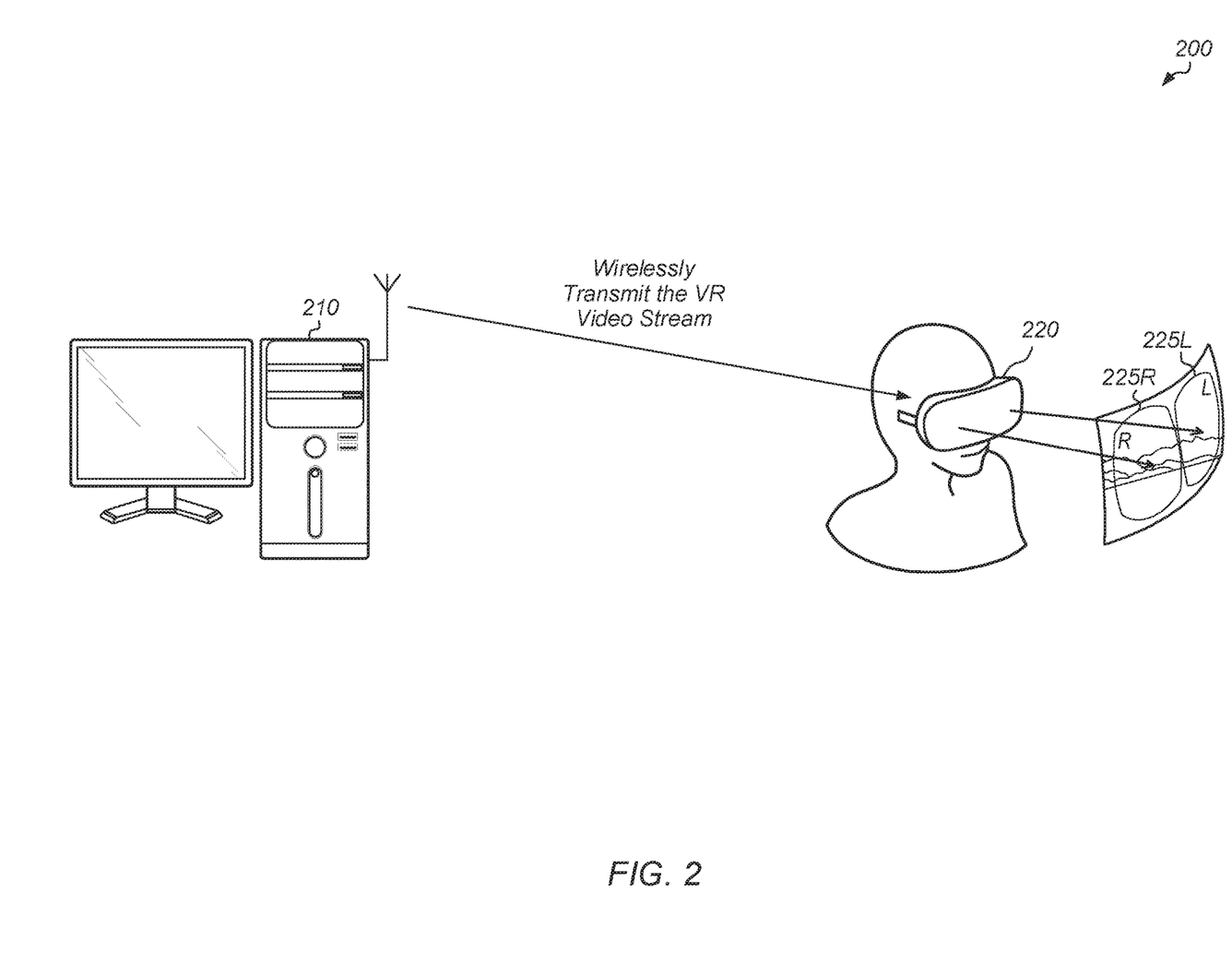
FIG. 2 is a block diagram of one implementation of a wireless virtual reality (VR) system.

Turning now to FIG. 2, a block diagram of one implementation of a wireless virtual reality (VR) system 200 is shown. System 200 includes at least computer 210 and head-mounted display (HMD) 220. Computer 210 is representative of any type of computing device which includes one or more processors, memory devices, input/output (I/O) devices, RF components, antennas, and other components indicative of a personal computer or other computing device. In other implementations, other computing devices, besides a personal computer, are utilized to send video data wirelessly to head-mounted display (HMD) 220. For example, computer 210 can be a gaming console, smart phone, set top box, television set, video streaming device, wearable device, a component of a theme park amusement ride, or otherwise. Also, in other implementations, HMD 220 can be a computer, desktop, television or other device used as a receiver connected to a HMD or other type of display.

Computer 210 and HMD 220 each include circuitry and/or components to communicate wirelessly. It is noted that while computer 210 is shown as having an external antenna, this is shown merely to illustrate that the video data is being sent wirelessly. It should be understood that computer 210 can have an antenna which is internal to the external case of computer 210. Additionally, while computer 210 can be powered using a wired power connection, HMD 220 is typically battery powered. Alternatively, computer 210 can be a laptop computer (or another type of device) powered by a battery.

In one implementation, computer 210 includes circuitry which dynamically renders a representation of a VR environment to be presented to a user wearing HMD 220. For example, in one implementation, computer 210 includes one or more graphics processing units (GPUs) executing program instructions so as to render a VR environment. In other implementations, computer 210 includes other types of processors, including a central processing unit (CPU), application specific integrated circuit (ASIC), field programmable gate array (FPGA), digital signal processor (DSP), or other processor types. HMD 220 includes circuitry to receive and decode a compressed bit stream sent by computer 210 to generate frames of the rendered VR environment. HMD 220 then drives the generated frames to the display integrated within HMD 220.

In one implementation, computer 210 encodes the frames of the rendered VR environment in a manner that results in a decreased data-rate for the resultant encoded bitstream. For example, in one implementation, computer 210 encodes the rendered VR environment by interleaving half-frames of the rendered VR environment while dropping (or "discarding") half a frame of each frame of the rendered VR environment. In one embodiment, dropping half a frame means content that would normally be included in that half of the frame (e.g., the video or image content) is not included and is replaced with other content. For example, for a first frame, computer 210 encodes the scene 225L on the left-side for transmission while dropping the scene 225R on the right-side. In this manner, little or no content of the original right-side of the frame is retained in the encoded frame that is transmitted to the receiver (e.g., the HMD 220). For the second frame, computer 210 encodes the scene 225R on the right-side of HMD 220 while dropping the scene 225L on the left-side of HMD 220. Computer 210 follows this pattern for subsequent frames of the rendered VR environment, alternating which half of the screen gets dropped. Computer 210 then sends the encoded half-frames and indications of which half-frames were dropped to HMD 220. HMD 220 decodes the encoded bitstream and reconstructs each frame by displaying one half-frame on the screen in the normal fashion and displaying all black or some other suitable representation on the screen for the dropped half-frame. In one implementation, computer 210 increases the resolution for the encoded half-frame using the savings from not sending the dropped half-frame. This will result in a higher quality image at HMD 220 than would otherwise be possible. As an alternative to dropping half of the frame, one half of the frame may be encoded as a constant value or otherwise encoded in a manner that consumes relatively little bandwidth when transmitted (e.g., one half of the frame may be more highly compressed than the other half). As used herein, a dropped portion (e.g., half in one embodiment) of a frame, more compressed portion of a frame, or any other approach that results in one portion of a frame being generated or encoded so that it will consume less bandwidth on transmission is referred to as having been encoded with a lower resolution than that of the other portion of the frame. Consequently, the other portion of the frame is deemed to have been encoded with a higher resolution than the other portion of the frame.

Figure 3:
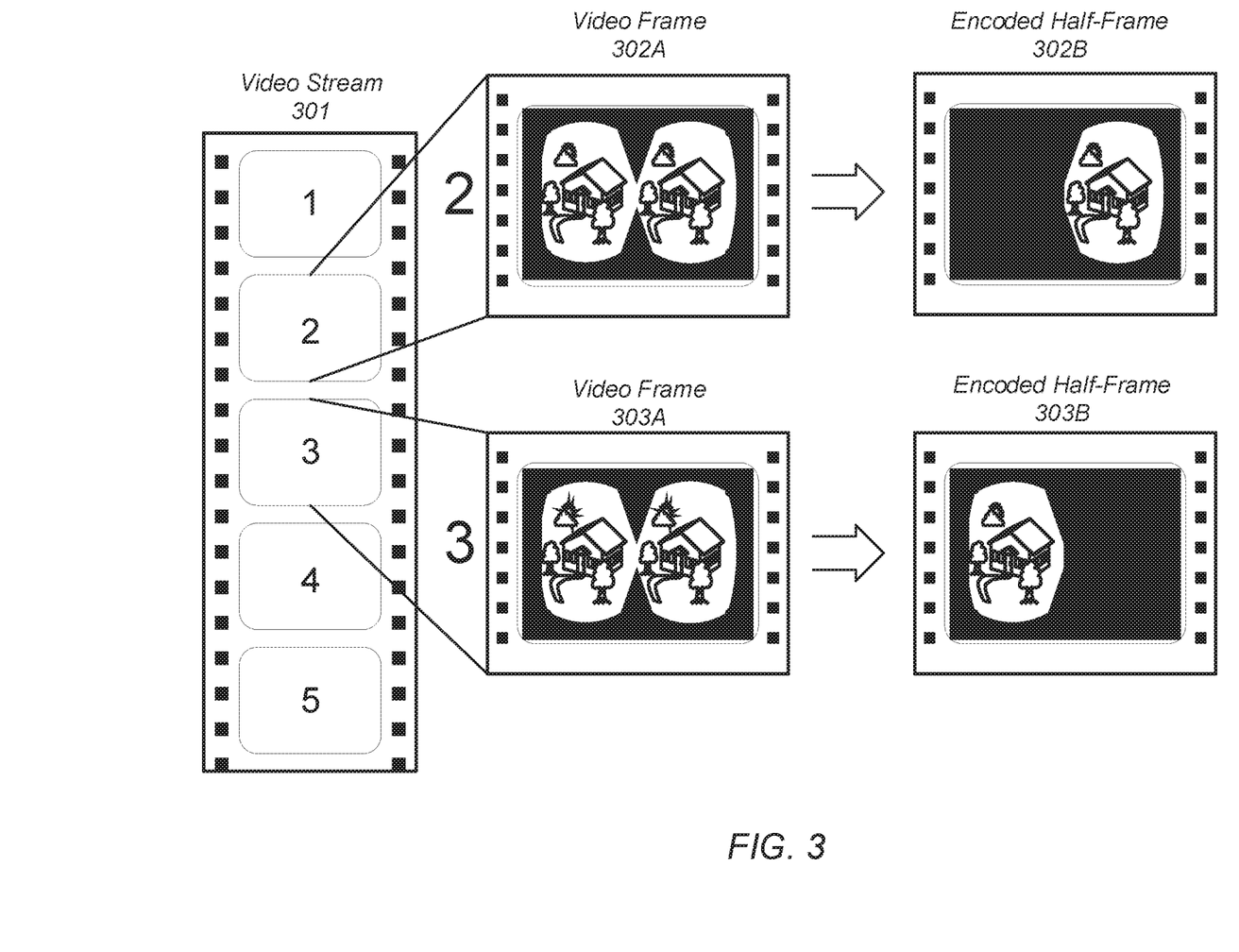
FIG. 3 is a diagram of one implementation of a video stream.

Referring now to FIG. 3, a diagram of one implementation of a video stream 301 is shown. The individual frames of a sample video stream 301 are shown on the left side of FIG. 3. The second video frame of video stream 301 is expanded and shown as video frame 302A. The contents of video frame 302A can be compressed and transmitted wirelessly from a transmitter (e.g., computer 210 of FIG. 2) to a receiver (e.g., HMD 220) as encoded half-frame 302B by only sending the right-half portion of the scene and dropping the left-half portion of the scene. As an alternative to dropping half of the frame, one half of the frame may be encoded as a constant value or otherwise encoded in a manner that consumes relatively little bandwidth when transmitted (e.g., one half of the frame may be more highly compressed than the other half). Then, after encoded half-frame 302B is sent wirelessly from the transmitter to the receiver, the next video frame 303A is prepared for transmission. The transmitter switches to only encoding and sending the left-half portion of the scene while dropping the right-half portion of the scene for encoded half-frame 303B.

In one implementation, if a first condition is detected, then video stream 301 is encoded using an interleaved transmission scheme by interleaving half-frames rather than encoding and transmitting the entire frame. For example, one half of each frame is encoded while the other half is dropped and then the halves are swapped on the subsequent frame. In other words, the left-half of a first frame is encoded while the right-half of the first frame is dropped, and then the left-half of a second frame is dropped while the right-half of the second frame is encoded. In this example, the second frame follows immediately after the first frame in the video sequence. This pattern continues for subsequent pairs of frames, such that the left-half of the frame is encoded and displayed every other frame and the right-half of the frame is encoded and displayed every other frame, with only one half of the frame active for a given frame. It is noted that the half-frame that is displayed can be referred to herein as the "active half" while the half-frame that is dropped can be referred to herein as the "inactive half".

In one implementation, the first condition is the frame rate being greater than a threshold. In another implementation, the first condition is the bandwidth requirements of the encoded video stream exceeding the link capacity of the wireless link. In a further implementation, the first condition is detecting a request to interleave half-frames by an application or a user. The dropped half of the frame can be presented to the user in a variety of ways, with the presentation technique varying according to the implementation. For example, in one implementation, the dropped half of the frame is displayed as a black half-screen. In another implementation, the dropped half of the screen is displayed as an average of the other half of the current frame or the same half of the previous frame. In a further implementation, a transfer function is applied to the intensity and/or brightness of the active half in order to generate the inactive half. In a still further implementation, the half of the previously received frame is replayed in place of the dropped half of the current frame. In other implementations, the dropped half of the frame is displayed in other suitable manners. Based on the way the human visual system works, the eyes and brain will combine the presented half-frame with the dropped half-frame in a non-conflicting manner such that the user will not notice the dropped half-frame. By sending only half of a frame, the bandwidth required to send the video stream is reduced by half.

Figure 4:
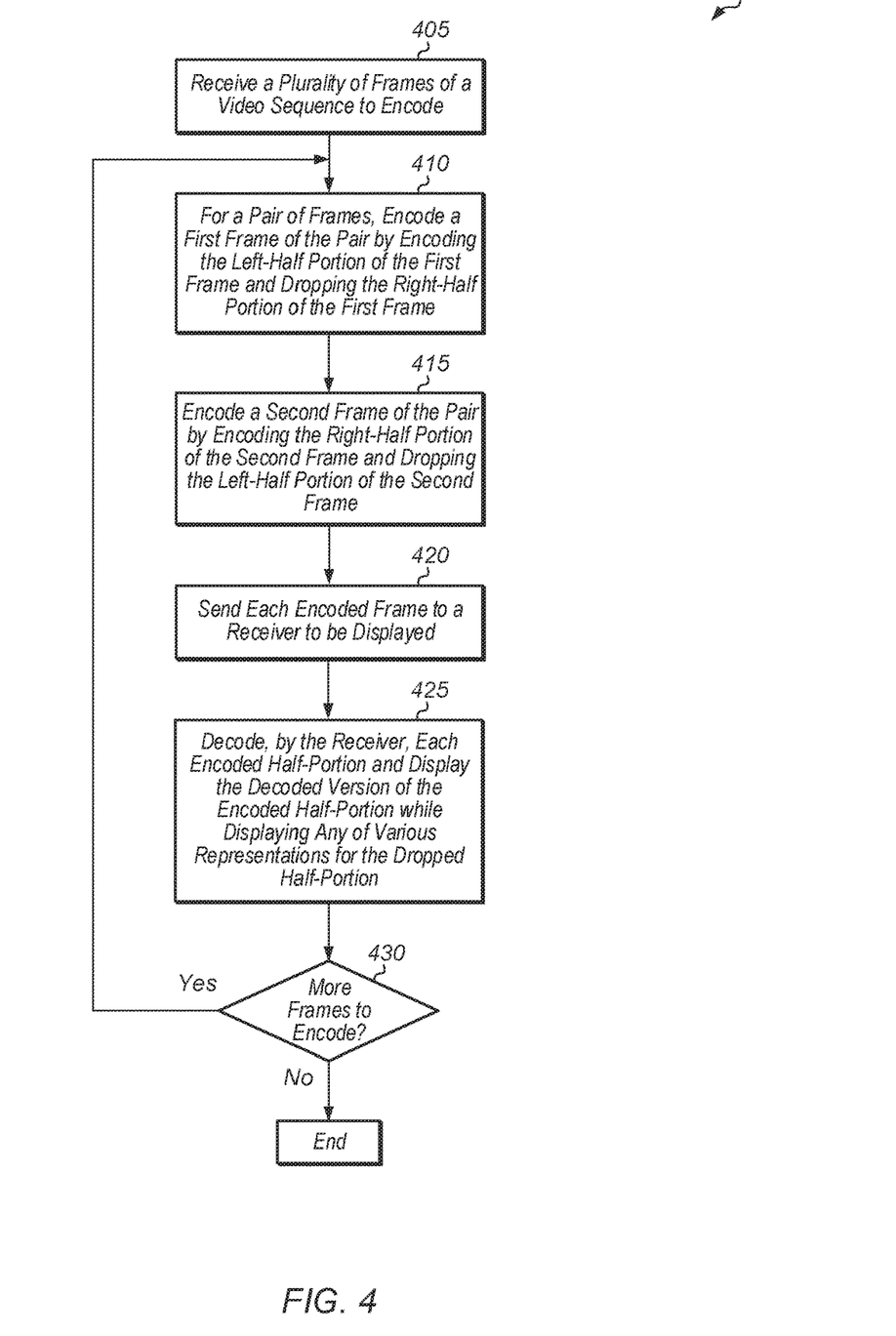
FIG. 4 is a generalized flow diagram illustrating one implementation of a method for interleaving half frames during encoding of a video stream.
Figure 5:
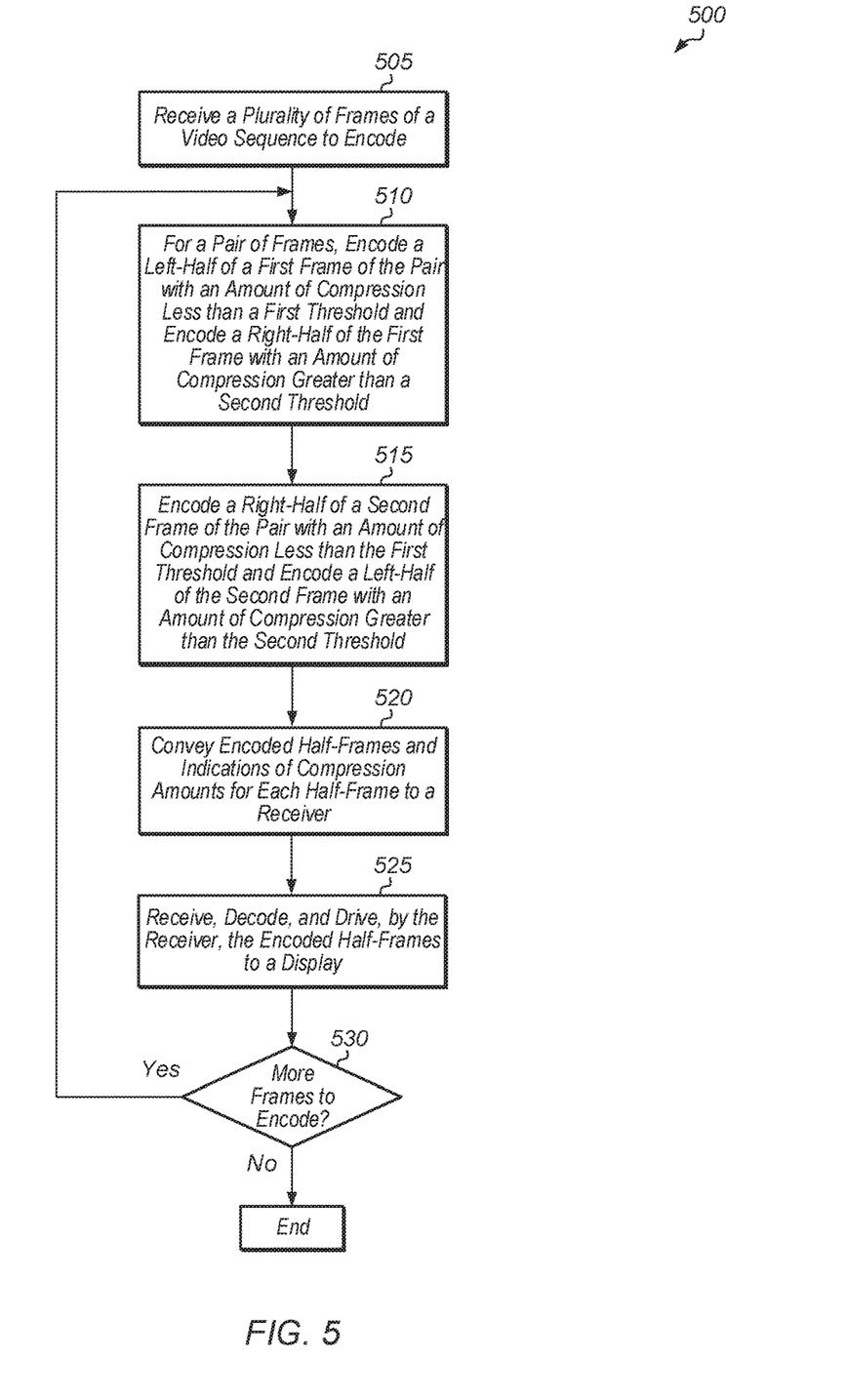
FIG. 5 is a generalized flow diagram illustrating one implementation of a method for using different amounts of compression when encoding separate halves of a video frame in an interleaved pattern.
Figure 6:
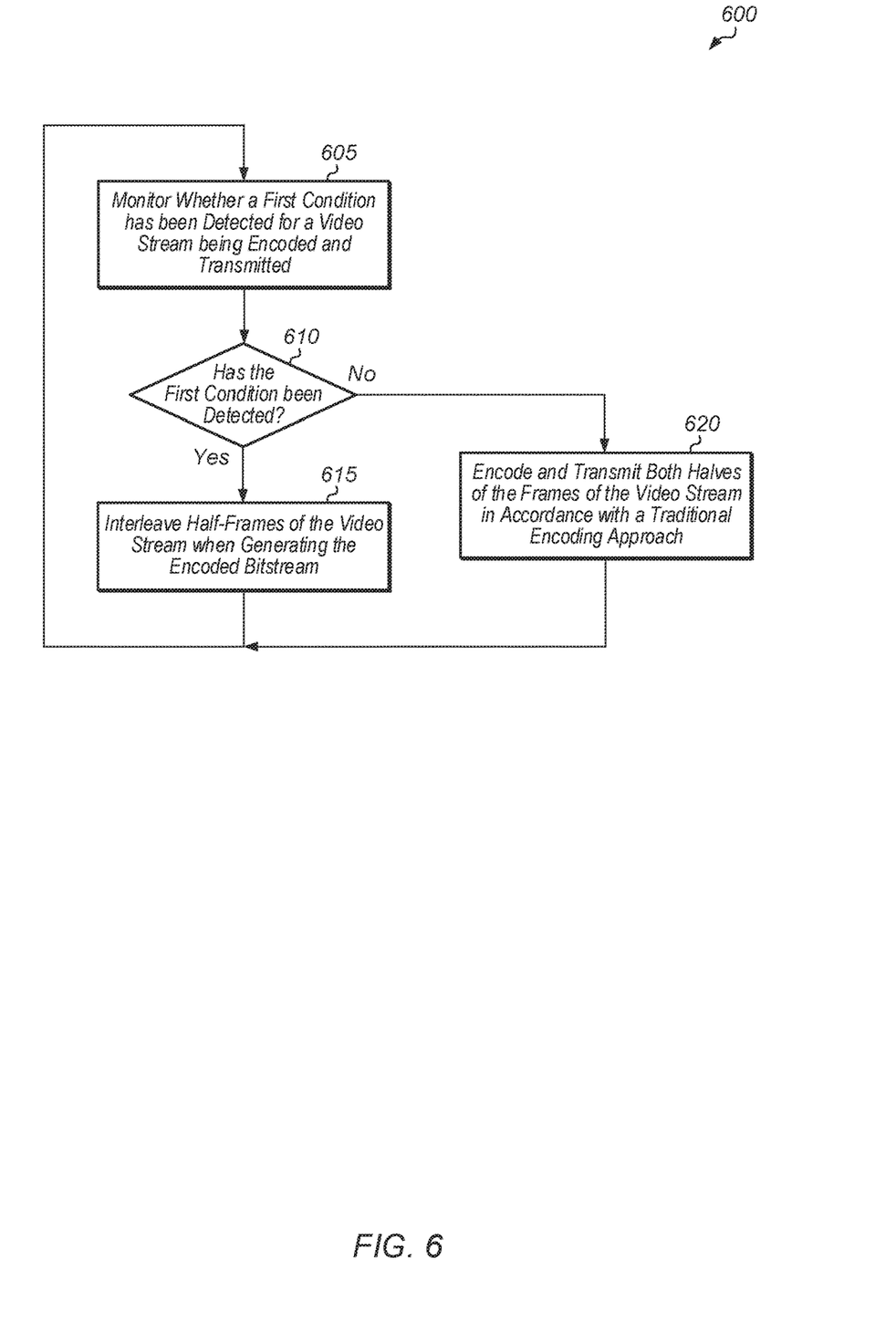
FIG. 6 is a generalized flow diagram illustrating one implementation of a method for determining when to interleave half-frames of a video stream.

Turning now to FIG. 4, one implementation of a method 400 for interleaving half frames during encoding of a video stream is shown. For purposes of discussion, the steps in this implementation and those of FIG. 5-6 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 400.

An encoder receives a plurality of frames of a video sequence to encode (block 405). In one implementation, the encoder is part of a transmitter or coupled to a transmitter. The transmitter can be any type of computing device, with the type of computing device varying according to the implementation. In one implementation, the transmitter renders frames of a video stream as part of a virtual reality (VR) environment. In other implementations, the video stream is generated for other environments. In one implementation, the encoder and the transmitter are part of a wireless VR system. In other implementations, the encoder and the transmitter are included in other types of system. In one implementation, the encoder and the transmitter are integrated together into a single device. In other implementations, the encoder and the transmitter are located in separate devices.

For every pair of frames, the encoder encodes (i.e., compresses) a first frame of the pair by encoding the left-half portion of the first frame and dropping the right-half portion of the first frame (block 410). In one implementation, the left-half portion refers to the half of the frame that will be presented to the left eye while the right-half portion refers to the half of the frame that will be presented to the right eye. Next, the encoder encodes a second frame of the pair by encoding the right-half frame and dropping the left-half frame (block 415). Then, the encoder sends each encoded frame to a receiver to be displayed (block 420). Next, the receiver decodes each encoded half-portion and displays the decoded version of the encoded half-portion while displaying any of various representations for the dropped half-frame (block 425). For example, in one implementation, the receiver displays all black pixels for the dropped half-frame. Next, if there are there more frames to encode (conditional block 430, "yes" leg), then method 400 returns to block 410. Otherwise, if there are there more frames to encode (conditional block 430, "no" leg), then method 400 ends.

It is noted that in other implementations, the encoder can repeat this pattern at other intervals rather than every pair of frames. For example, in another implementation, the encoder could drop the left half-frame once every three frames and drop the right half-frame once every three frames. In another implementation, the encoder could drop the left half-frame once every four frames and drop the right half-frame once every four frames. In other implementations, the encoder could drop half-frames at other frequencies, such as twice every five frames, three times every eight frames, or any other desired scheduling pattern.

Referring now to FIG. 5, one implementation of a method 500 for using different amounts of compression when encoding separate halves of a video frame in an interleaved pattern is shown. A transmitter receives a plurality of frames of a video stream to encode (block 505). For each pair of frames, the transmitter encodes a left-half of a first frame of the pair with an amount of compression less than a first threshold and encodes a right-half of the first frame with an amount of compression greater than a second threshold (block 510). It is assumed for the purposes of this discussion that the first threshold is less than the second threshold. Also for each pair of frames, the transmitter encodes a right-half of a second frame of the pair with an amount of compression less than the first threshold and encodes a left-half of the second frame with an amount of compression greater than the second threshold (block 515). Next, the transmitter conveys encoded half-frames and indications of compression amounts for each half-frame to a receiver (block 520). The receiver receives, decodes, and drives the encoded half-frames to a display (block 525). If the transmitter detects more frames of the video frame to encode (conditional block 530, "yes" leg), then method 500 returns to block 510. Otherwise, if there are no more frames of the video frame to encode (conditional block 530, "no" leg), then method 500 ends.

Turning now to FIG. 6, one implementation of a method 600 for determining when to interleave half-frames of a video stream is shown. A transmitter monitors whether a first condition has been detected for a video stream being encoded and transmitted (block 605). In one implementation, the first condition has been detected if the content in the current frame of the video stream is changing at less than a threshold rate from the previous frame. For example, in this implementation, motion estimation data is monitored so as to determine if the first condition has been detected. If the change detected is less than some threshold, then interleaving is used. In another implementation, the first condition is a link condition being impaired (e.g., obstructed, etc.) or the available link capacity falling below a threshold. In a further implementation, the first condition is a frame rate of the video stream being higher than a threshold. In other implementations, the first condition is a combination of two or more of these factors and/or one or more other conditions.

If the first condition has been detected (conditional block 610, "yes" leg), then the transmitter interleaves half-frames of the video stream when generating the encoded bitstream (block 615). Examples of different ways of interleaving half-frames of the video stream when generating the encoded bitstream are described in methods 400 and 500 (of FIGS. 4 and 5, respectively). Other techniques of interleaving half-frames of the video stream when generating the encoded bitstream are possible and are contemplated. If the first condition has not been detected (conditional block 610, "no" leg), then the transmitter encodes and transmits both halves of the frames of the video stream in accordance with a traditional encoding approach (block 620). After blocks 615 and 620 and optionally adding a delay, method 600 returns to block 605.

In various implementations, program instructions of a software application are used to implement the methods and/or mechanisms described herein. For example, program instructions executable by a general or special purpose processor are contemplated. In various implementations, such program instructions can be represented by a high level programming language. In other implementations, the program instructions can be compiled from a high level programming language to a binary, intermediate, or other form. Alternatively, program instructions can be written that describe the behavior or design of hardware. Such program instructions can be represented by a high-level programming language, such as C. Alternatively, a hardware design language (HDL) such as Verilog can be used.

In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. An apparatus comprising:
a transmitter configured to convey data; and
an encoder configured to use an interleaved transmission scheme in which the encoder is configured to:
receive a plurality of frames of a video stream, wherein each frame of a plurality of frames of the video stream include a stereoscopic image;
generate an encoded first frame of a pair of frames by encoding a left-half of a first frame of the pair of frames with a lower resolution than a right-half of the first frame;
generate an encoded second frame of the pair of frames by encoding a right-half of the second frame with a lower resolution than a left-half of the second frame; and
transmit the encoded first frame and the encoded second frame.

2. The apparatus as recited in claim 1, wherein to generate an encoded first half of a given frame with a lower resolution than a second half of the given frame, the encoder is configured to:
drop the first half of the given frame;

encode the first half of the given frame as a constant value; and encode the first half of the given frame with a higher compression than that of the second half of the given frame.

3. The apparatus as recited in claim 2, wherein in place of the left half of the first frame, the encoder is configured to perform at least one of:

insert all pixels as a single color;

insert an average of pixel values generated from a previous frame; and insert an average of pixel values generated from the right half of the frame.

4. The apparatus as recited in claim 1, wherein the transmitter is further configured to transmit indications of which half-frames were encoded with the lower resolution.

5. The apparatus as recited in claim 1, wherein the encoder is configured to:

use the interleaved transmission scheme in response to detecting a first condition is met; and encode both halves of the encoded first frame with a same resolution in response to detecting the first condition is not met.

6. The apparatus as recited in claim 5, wherein detecting the first condition is met comprises:

detecting a frame rate of the video stream exceeds a threshold;

detecting bandwidth requirements of the video stream exceed a link capacity of a transmission link; and detecting a change in content of the first frame compared to a previous frame is less than a threshold.

7. The apparatus as recited in claim 1, wherein the encoder is configured to use the interleaved transmission scheme based at least in part on an available wireless transmission bandwidth.

8. A method comprising:

receiving, by an encoder, a plurality of frames of a video stream, wherein each frame of a plurality of frames of the video stream include a stereoscopic image; and using an interleaved transmission scheme by:

generating an encoded first frame of a pair of frames by encoding a left-half of a first frame of the pair of frames with a lower resolution than a right-half of the first frame;

generating an encoded second frame of the pair of frames by encoding a right-half of the second frame with a lower resolution than a left-half of the second frame; and transmitting the encoded first frame and the encoded second frame.

9. The method as recited in claim 8, wherein to generate an encoded first half of a given frame with a lower resolution than a second half of the given frame, the method comprises:

dropping the first half of the given frame;

encoding the first half of the given frame as a constant value; and encoding the first half of the given frame with a higher compression than that of the second half of the given frame.

10. The method as recited in claim 9, further comprising transmitting indications of which half-frames were encoded with a lower resolution.

11. The method as recited in claim 10, wherein in place of the left half of the first frame, the method comprises:

inserting all pixels as a single color;

inserting an average of pixel values generated from a previous frame; and inserting an average of pixel values generated from the right half of the frame.

12. The method as recited in claim 10, further comprising:

using the interleaved transmission scheme in response to detecting a first condition is met; and encoding both halves of the encoded first frame with a same resolution in response to detecting the first condition is not met.

13. The method as recited in claim 10, wherein detecting the first condition is met comprises:

detecting a frame rate of the video stream exceeds a threshold;

detecting bandwidth requirements of the video stream exceed a link capacity of a transmission link; and detecting a change in content of the first frame compared to a previous frame is less than a threshold.

14. The method as recited in claim 8, wherein the video stream is rendered as part of a virtual reality (VR) application.

15. A system comprising:

a transmitter; and a receiver;

wherein the transmitter is configured to:

receive a plurality of frames of a video stream, wherein each frame of a plurality of frames of the video stream include a stereoscopic image;

encode a pair of frames of the plurality of frames of the video stream by encoding a left-half of a first frame of the pair of frames with a lower resolution than a right-half of the first frame; and encoding a right-half of the second frame with a lower resolution than a left-half of the second frame; and transmit the encoded first frame and the encoded second frame to the receiver;

wherein the receiver is configured to generate a new first frame with a single resolution based on the encoded first frame by generating a new right-half for the received right-half of the encoded first frame.

16. The system as recited in claim 15, wherein the receiver is configured to generate the new right-half based at least in part on a right-half of a previously received frame.

17. The system as recited in claim 16, wherein in place of the left half of the first frame, the processor is configured to perform at least one of:

insert all pixels as a single color;

insert an average of pixel values generated from a previous frame; and insert an average of pixel values generated from the right half of the frame.

18. The system as recited in claim 15, wherein to generate an encoded first half of a given frame with a lower resolution than a second half of the given frame, the processor is configured to perform at least one of:

drop the first half of the given frame;

encode the first half of the given frame as a constant value; and encode the first half of the given frame with a higher compression than that of the second half of the given frame.

19. The system as recited in claim 15, wherein the processor is further configured to transmit indications of which half-frames were dropped via the wireless transceiver module.

20. The system as recited in claim 15, wherein the processor is configured to:

use the interleaved transmission scheme in response to detecting a first condition is met; and encode both halves of the encoded first frame with a same resolution in response to detecting the first condition is not met.

* * * * *